US005458942A

United States Patent [19]
Miller

[11] Patent Number: 5,458,942
[45] Date of Patent: Oct. 17, 1995

[54] FORM-FITTING COVERINGS FOR BOARD FENCING

[76] Inventor: Conrad J. Miller, Rte. #1 Box 387, Warrenton, Va. 22186

[21] Appl. No.: 155,542

[22] Filed: Nov. 22, 1993

[51] Int. Cl.$^6$ ................................................ E04H 17/00
[52] U.S. Cl. ............................ 428/76; 52/738.1; 256/19; 428/99
[58] Field of Search ................................ 428/99, 68, 76, 428/33, 122; 256/21, 24, 19; 52/724, 725, 727; 24/576, 587

[56] References Cited

U.S. PATENT DOCUMENTS

| | | | |
|---|---|---|---|
| 3,338,284 | 8/1967 | Ausnit | 428/99 X |
| 4,725,463 | 2/1988 | Baumber et al. | 428/99 X |
| 4,845,916 | 7/1989 | Villard | 428/33 X |
| 4,943,226 | 7/1990 | Pottorff | 428/99 X |
| 5,217,771 | 6/1993 | Schmanski et al. | 428/99 X |
| 5,304,412 | 4/1994 | Wang | 428/542.2 X |

*Primary Examiner*—Henry F. Epstein
*Attorney, Agent, or Firm*—Morgan & Finnegan

[57] ABSTRACT

A form-fitting covering for board fencing includes a sheet of weather-resistant material which is folded to form a rectangular enclosure which envelopes a fencing board therein. Complementary fasteners are integrally formed at longitudinal edges of the sheet which are juxtaposed and interfitted after folding to maintain the enclosure in its rectangular shape. A two-part covering for a fencing post includes interfitting projections which maintain two juxtaposed sheets as an enclosure which envelopes a fencing post. A cap is provided over the top of the enclosure.

7 Claims, 5 Drawing Sheets

FIG. 4
FIG. 5
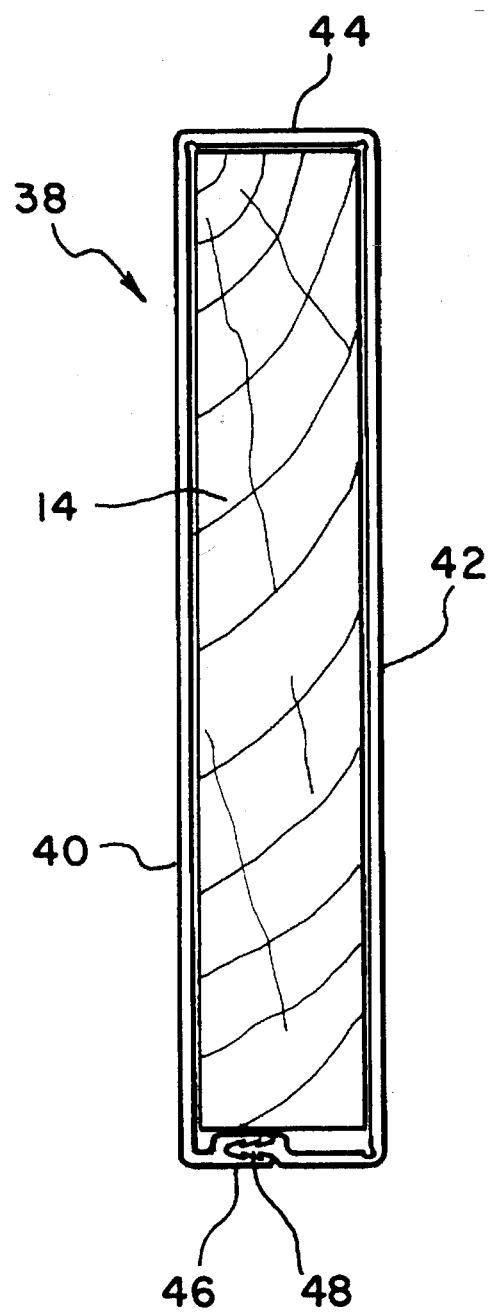
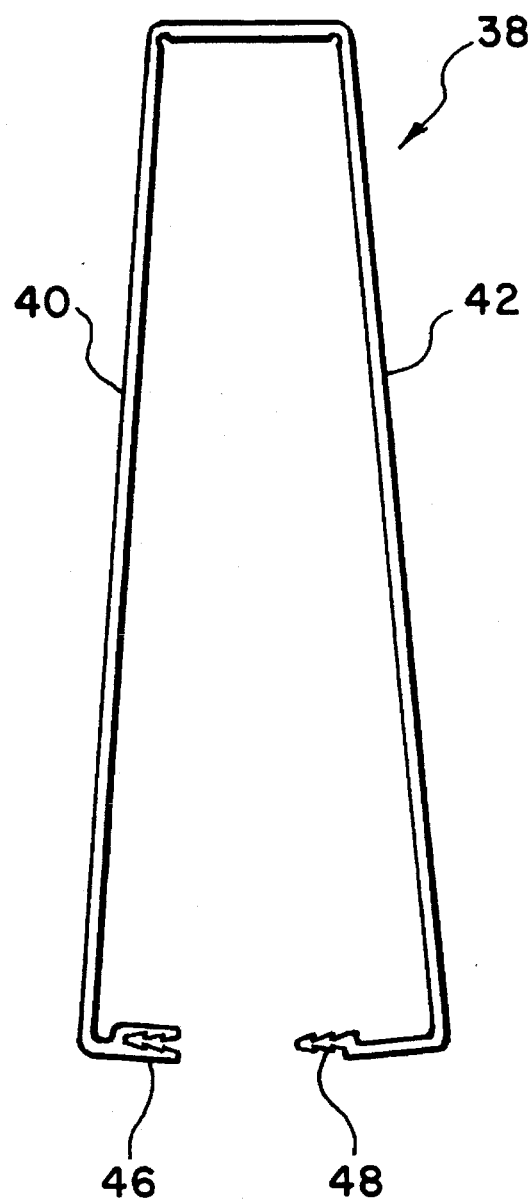

FORM-FITTING COVERINGS FOR BOARD FENCING

FIELD OF THE INVENTION

The present invention relates generally to fencing materials and, more specifically, to a form-fitting coverings that envelope boards and posts of a fencing structure, thereby protecting same from the elements while adding to its aesthetic qualities. Sheets of protective material are wrapped around individual boards of the fence and then longitudinal edges are snap-fitted together at the underside of each board. Two-piece board and post coverings having complimentary fasteners are also provided.

BACKGROUND OF THE INVENTION

Board fencing is desirable for its strength and attractiveness. It is also relatively expensive due to the materials used and the amount of labor necessary for construction. Typical materials include oak for boards and locust or pressure-treated pine for posts.

After construction, the boards and posts are typically painted with an oil-based paint to preserve the wood and also to provide an aesthetic appearance. Painting is quite labor intensive and is necessarily repeated throughout the life of the fencing structure as the paint begins to peel or wear off. Even under the best of circumstances, painting is not completely adequate for preventing water from penetrating the boards and posts. Over time, weather degrades the fencing structure to the point of requiring replacement, at considerable cost.

SUMMARY OF THE INVENTION

An object of the present invention is to provide form-fitting coverings for board fencing capable of protecting the fencing components from the elements while adding to the aesthetics of the structure.

Another object of the present invention is to provide form-fitting coverings for board fencing capable of being installed without special tools or applicators, and with relatively unskilled labor.

Still another object of the present invention is to provide form-fitting coverings for board fencing which can be retrofitted onto existing fencing or installed on new fencing during construction.

These and other objects of the invention are met by providing a form-fitting covering for board fencing which includes a flexible sheet having a length corresponding to a length of a fencing board, two parallel opposite longitudinal side edges, a plurality of fold lines disposed between the two side edges and spaced apart to form the sheet, when folded, into a rectangular enclosure enveloping the fencing board, and complementary fastener means for joining the two side edges together.

In another aspect of the invention, a covering for either a post or a board includes first and second sheets, each having parallel opposite longitudinal edges, and complementary fastener means for joining the two side edges of one sheet to the two side edges of the other sheet.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

FIG. 4 is an end view of an alternative embodiment of board covering, with a board enveloped therein;

FIG. 5 is an end view of the FIG. 4 embodiment, prior to interfitting the juxtaposed side edge portions;

DETAILED DESCRIPTION OF THE PREFERRED EMBODIMENTS

Figure 1:
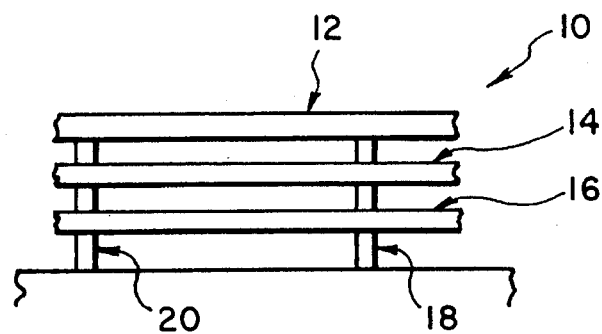
FIG. 1 is a side elevational view of a typical board fencing structure, to which the present invention can be installed.

As seen in FIG. 1, a typical board fencing structure 10 includes a plurality of boards 12, 14, and 16 mounted on a plurality of posts 18 and 20. Conventionally, the boards are nailed to the posts and then painted.

Figure 2:
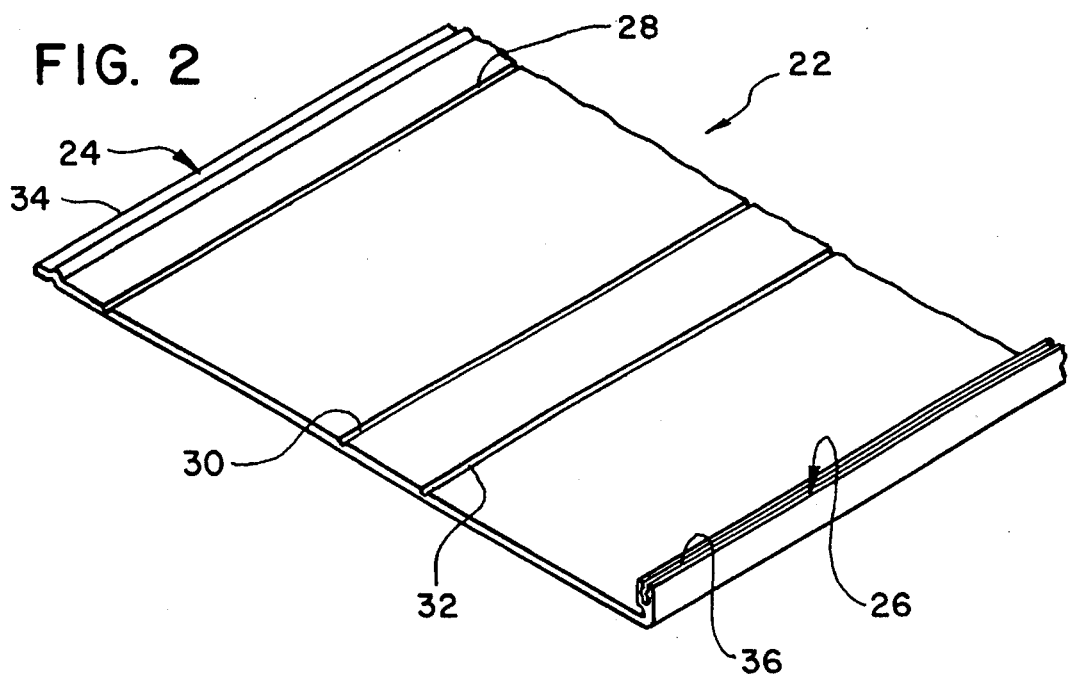
FIG. 2 is a perspective view of a board covering according to the present invention, prior to being folded into its rectangular, board enveloping shape.
Figure 3:
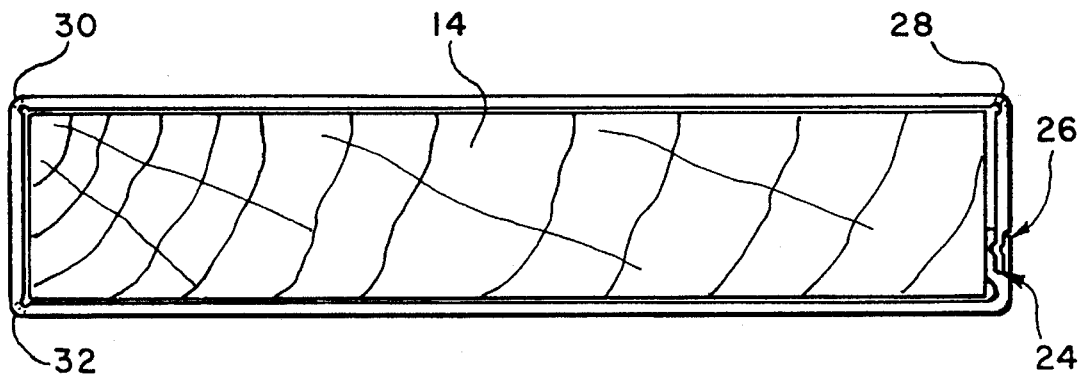
FIG. 3 is an enlarged end view of the covering folded to envelope a fencing board.

Referring to FIGS. 2 and 3, a board covering 22 is made of an extruded sheet of rigid plastic material, such as polyvinylchloride (PVC) homopolymer compound modified for cold weather impact retention. An additive of titanium dioxide pigment is included for long term ultraviolet light resistance and for achieving a desired color. The material is classified as ASTM D 1784 -13353B, and has an ASTM-D 256 Izod impact strength (ft.lbs./inch notch)

23° C.  5.0 (.2)
0° C.  2.0 (1.5)

The material also has an ASTM D 638 tensile strength of about 6,000 psi, and an ASTM D 638 tensile modulus of 425,000 psi, a deflection temperature of 67° C.

The sheet has two opposite parallel side edges 24 and 26 and three longitudinal parallel fold lines 28, 30 and 32 disposed therebetween at spaced intervals. The spacing of the fold lines is such that when the sheet is folded around a board (typically six inches wide and one inch thick) the sheet is form-fitted over the board to envelope same. In the folded condition, the side edges 24 and 26 are juxtaposed and interlocked with suitable complementary fastener means.

As seen in FIG. 3, the sheet envelopes the board 14 after folding, and then the edges 24 and 26 are juxtaposed and interconnected. In the illustrated embodiment, the fastener means for joining the edges comprises complementary tongue 34 and groove 36 formations integral with the edges 24 and 26, respectively. Appropriate hook and catch formations can be provided to prevent separation of the complementary portions.

After the board is enveloped and the side edges fastened together, the board can be nailed to a post. The enveloped board is preferably oriented so that the joint between the edges 24 and 26 is on the bottom, thus minimizing water seepage into the board.

An alternative one-piece board cover 38 is seen in FIGS. 4 and 5. The cover 38 is extruded as a substantially U-shaped member, in which the arms 40 and 42 of the "U" are at angles of approximately five to ten degrees relative to the base 44. The cover 38 can be cut to desired lengths, depending on the length of the boards to be enveloped. Complementary to male and female coupling formations 46 and 48 are integrally formed on juxtaposed longitudinal side edges of the cover. After fitting the cover 38 over the board 14, the formations 46 and 48 are snap-fitted together.

Figure 6:
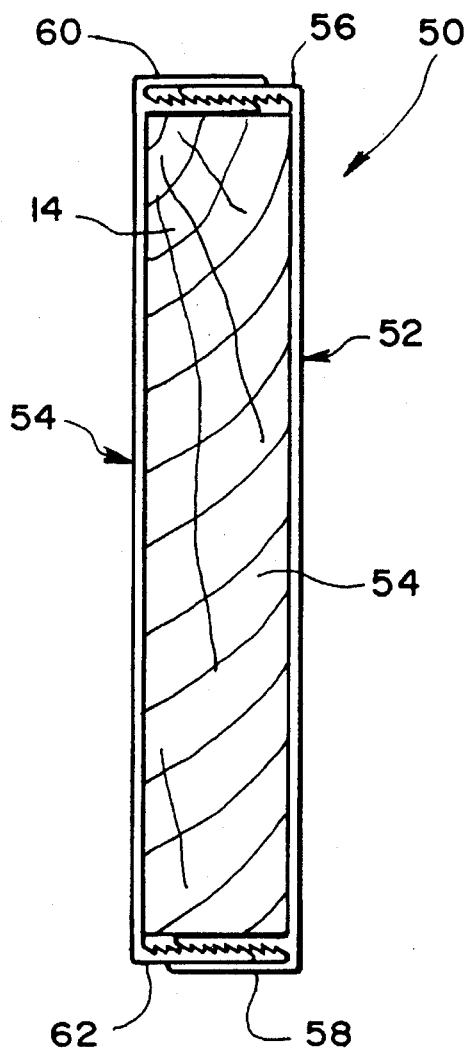
FIG. 6 is an end view of another embodiment of a board covering according to the present invention.
Figure 8:
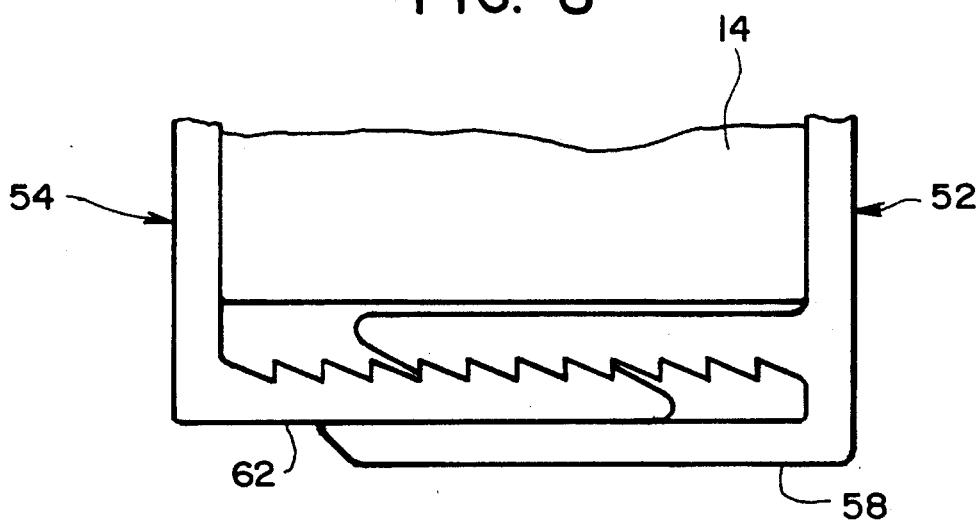
FIG. 8 is an enlarged end view, showing complimentary fastener means between the two-piece covering.

A further embodiment of a board covering is seen in FIG. 6. The covering 50 includes two sheets 52 and 54 which are interfitted to envelope the board 14. Sheet 52 has two projections 56 and 58 formed on at opposite longitudinal sides, while sheet 54 has similar, complementary projections 60 and 62. As seen in FIG. 8, the projection 62 of sheet 54 is serrated and is slidably received in a serrated groove of the projection 58 of sheet 52. With this embodiment, the width of the covering 50 can be adjusted to form-fit tightly on boards of varying width.

Figure 7:
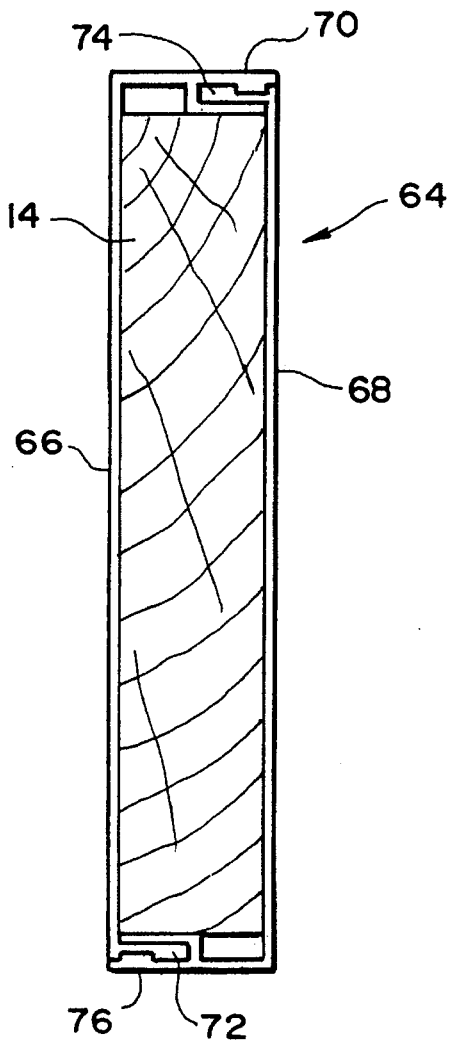
FIG. 7 is an end view of another embodiment of a board covering according to the present invention.

FIG. 7 is a variation of the FIG. 6 embodiment, in which the covering 64 includes two sheets 66 and 68, each having interfitting projections formed on opposite longitudinal edge portions. Sheet 66 has projections 70 and 72, which interfit with projections 74 and 76 of sheet 68.

Figure 9:
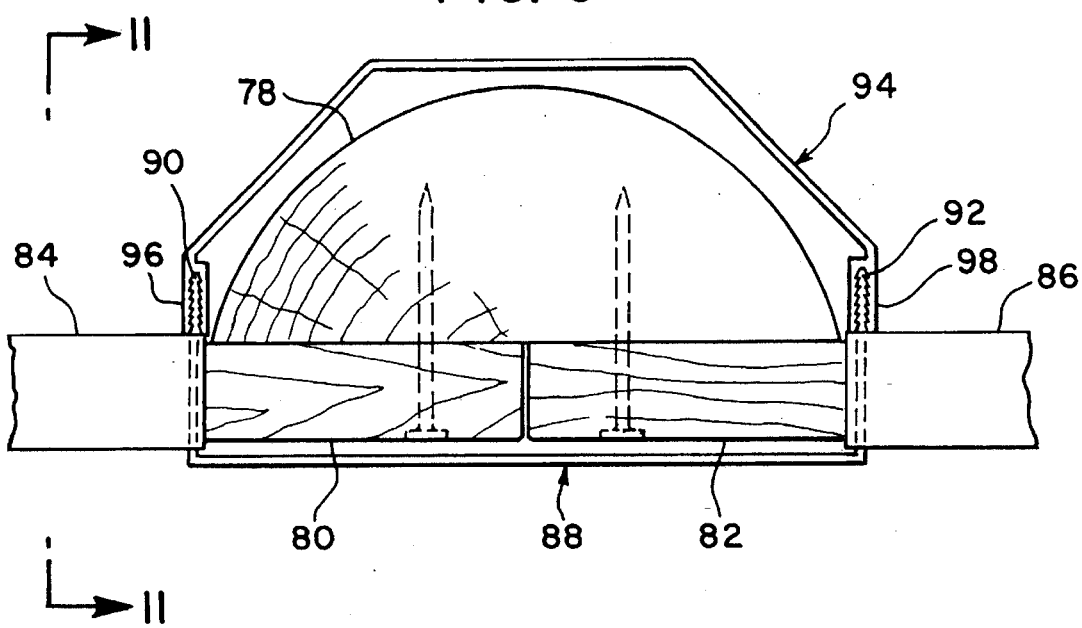
FIG. 9 is a top view of a fencing structure showing post and board coverings according to the present invention.
Figure 10:
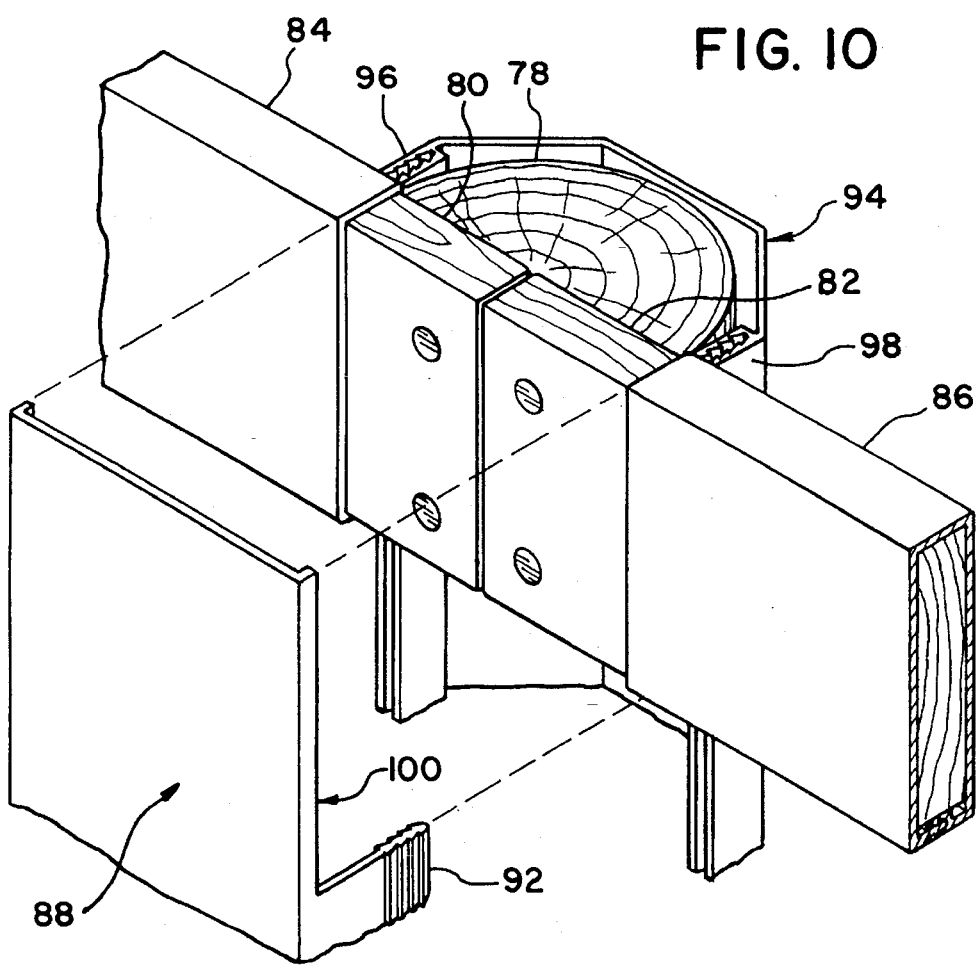
FIG. 10 is exploded perspective view of the fencing structure of FIG. 9.

FIGS. 9 and 10 illustrate a post 78 having the ends of two top boards 80 and 82 nailed thereto. In the illustrated embodiment, the board coverings 84 and 86 are installed as a retrofit on a pre-existing fencing structure. The ends of the coverings 84 and 86 abut the sides of the post 78 so as to expose end portions of the boards 80 and 82.

The post covering includes a front member 88 having opposite side longitudinal arms 90 and 92 with serrated headed ends, and a rear member 94 having opposite side longitudinal arms 96 and 98 with serrated sockets formed therein. The sockets of arms 96 and 98 are adapted to engage the headed ends of arms 90 and 92 to firmly hold the two members 88 and 94 together.

The member 94 can be shaped in any suitable form to conform to the general shape of the post. A five-sided member is shown in FIGS. 9 and 10 since the post is semi-circular in shape. The front member 88 should be sized and shaped to close any or most gaps between the post 78 and the boards 84 and 86, and the boards of other rows (not shown). For example, a cut-out 100 is provided at locations where the boards are nailed to the post 78. The cut-outs can be formed on site using a knife or other suitable means. For new fencing structures, it may be possible to have the cut-outs pre-formed.

Figure 11:
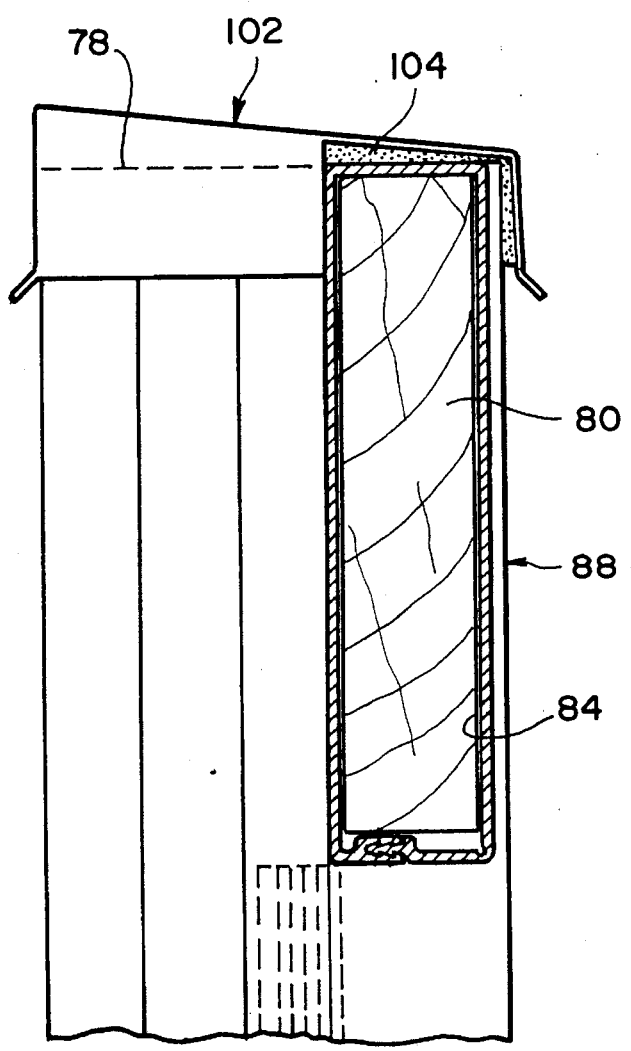
FIG. 11 is a sectional view taken along line X—X of FIG. 9.
Figure 12:
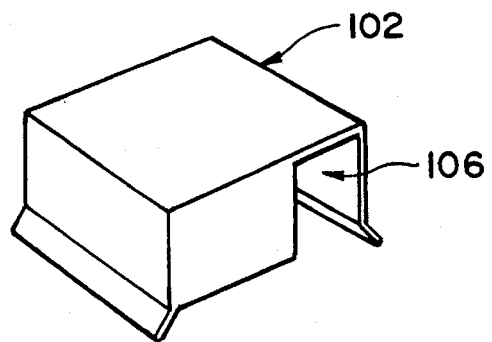
FIG. 12 is a perspective view of the post cap illustrated in FIG. 11.

As seen in FIGS. 11 and 12, a cap 102 is fitted over the top of the post 78 to keep moisture out. The cap 102 can be made of any suitable weather resistant material, such as extruded aluminum with a KYNAR finish of desirable color. Both ends are bent to drain water away from the post. A bead of sealant 104 can bed provided to keep water from entering the cut-out area 106 which accommodates the top boards.

While advantageous embodiments have been chosen to illustrate the invention, it will be understood by those skilled in the art that various changes and modifications can be made therein without departing from the scope of the invention as defined in the appended claims.

What is claimed is:

1. A form-fitting covering for a fence having a plurality of boards supported on a plurality of posts, comprising:

a plurality of board enclosures, each made of weather-resistant material and having first and second interfitting portions which form-fit on and thereby envelope corresponding ones of the plurality of boards;

first complementary fastener means, formed on each board enclosure for joining the first and second portions together, with the corresponding boards enveloped therein;

a plurality of post enclosures, each made of weather-resistant material and having first and second interfitting portions which form-fit on and thereby envelope corresponding ones of the plurality of posts; and second complementary fastener means, formed on each post enclosure for joining the first and second portions together, with the Corresponding posts enveloped therein, each board enclosure having a length adapted to extend between each two adjacent posts.

2. A form-fitting covering according to claim 1, wherein each board enclosure comprises a substantially planar member having longitudinal fold lines positioned to define the two interfitting portions when the planar member is folded.

3. A form-fitting covering according to claim 1, wherein the first and second portions of each board enclosure are integrally connected to each other.

4. A form-fitting covering according to claim 1, wherein each board enclosure comprises first and second substantially planar interfitting members, each having opposite side edges, the first complementary fastener means being formed on the opposite longitudinal side edges of each substantially planar interfitting member.

5. A form-fitting covering according to claim 1, wherein each post covering comprises first and second interfitting members, each having opposite side edges, the second complementary fastener means being formed on the opposite longitudinal side edges of each substantially planar interfitting member.

6. A form-fitting covering according to claim 1, further comprising a post cap fitted on top of each post.

7. A form-fitting covering according to claim 1, wherein each board enclosure and each post enclosure is made of plastic material.

\* \* \* \* \*